United States Patent [19]

Umetsu et al.

[11] Patent Number: 4,631,640

[45] Date of Patent: Dec. 23, 1986

[54] PORTABLE RADIO DEVICE FOR PROTECTING A RADIO CIRCUIT FROM STATIC ELECTRICITY

[75] Inventors: Shinjiro Umetsu; Takashi Oyamada, both of Tokyo, Japan

[73] Assignee: Nippon Electric Co. Ltd., Tokyo, Japan

[21] Appl. No.: 766,685

[22] Filed: Aug. 19, 1985

[30] Foreign Application Priority Data

Nov. 13, 1981 [JP] Japan ................................. 56-181910

[51] Int. Cl.⁴ ............................................ H05K 7/00
[52] U.S. Cl. ................................ 361/422; 174/138 D; 174/159; 411/903
[58] Field of Search .................... 174/138 D, 159, 5 R, 174/72 B; 411/417, 903, 908; 361/422, 278; 200/304, 305; 363/22; 340/825.31, 825.56; 324/72; 373/98, 106; 73/639

[56] References Cited

U.S. PATENT DOCUMENTS

| 2,191,171 | 2/1940 | Lee et al. | 174/159 |
| 2,432,986 | 12/1947 | Forman | 174/159 |
| 2,706,774 | 4/1955 | Bowman | 174/5 R |
| 3,078,334 | 2/1963 | Forman | 174/159 |
| 3,102,571 | 9/1963 | Scott | 174/138 D |
| 3,105,167 | 9/1963 | Broderick | 174/5 R |
| 3,592,100 | 7/1971 | MacKiewicz | 174/159 |

FOREIGN PATENT DOCUMENTS

| 0459202 | 4/1928 | Fed. Rep. of Germany | 174/138 D |
| 0063148 | 5/1949 | Netherlands | 174/138 D |
| 0637749 | 5/1950 | United Kingdom | 174/138 D |

Primary Examiner—G. P. Tolin
Assistant Examiner—Gregory D. Thompson
Attorney, Agent, or Firm—Sughrue, Mion, Zinn, Macpeak, and Seas

[57] ABSTRACT

In a portable radio device comprising a housing (20), a printed wiring board (11) encased in the housing, and a machine screw (50) for fastening the board to the housing through a tapped and a via hole (17) and (25), the machine screw has head and threaded portions (51) and (52) and an insulating cap (55) of a cylindrical shape covering the head portion and having at least one groove. Preferably, a pair of the grooves (56, 57) are formed parallel to an axis of the machine screw. The head portion may be circular or polygonal in cross section and have at least one screw slot. At least one groove may be formed on an upper end surface of the insulating cap. Alternatively, the machine screw may wholly be made of an insulating material.

5 Claims, 7 Drawing Figures

PORTABLE RADIO DEVICE FOR PROTECTING A RADIO CIRCUIT FROM STATIC ELECTRICITY

BACKGROUND OF THE INVENTION

This invention relates to a portable radio device, such as a radio pager, a transceiver, or the like, which serves to rapidly transmit information to a person with such a portable radio device whenever and/or wherever and which is indispensable for an informationalized or an information-centered society in nowadays.

Heretofore, proposals have been made for a wide variety of portable electronic devices, such as an electronic wrist watch, a portable calculator in addition to a portable radio device of the type described. Each of the portable electronic devices includes an integrated circuit (an IC), a large scale integrated circuit (an LSI), or the like which is encased in a housing. Inasmuch as the electronic wrist watch and the portable calculator do not need to receive any radio waves, it may be possible with the electronic wrist watch and the portable calculator to use, as the housing, a metallic housing which is capable of shielding the IC or the LSI from radio waves.

On the other hand, the portable radio device should not make use of a metallic housing and, otherwise, reception of radio waves becomes impossible in consequence of the shielding of the radio waves. Therefore, the housing is formed by a nonconductive material in such a portable radio device. Besides, an antenna has been encased in the nonconductive housing together with the IC or the LSI in order to realize miniaturization of the portable radio device. A recent trend has been directed towards use of an intricate IC or LSI to satisfy various kinds of auxiliary operations required by the person with the portable radio device.

It is mentioned here that such a portable radio device may often be used in an environment in which static electricity readily occurs. For example, the static electricity strongly takes place when the person with the portable radio device walks on a carpet laid on a floor and humidity is between 15% and 35%. Under the circumstances, a body of the person is often electrified or charged at about 12 kilovolts.

It should be noted here that the IC and the LSI are weak against such a high static electricity because they are operated at a low voltage. When the person body is electrified at the static electricity of about 12 kilovolts, such electrification and discharge following the electrification being about malfunction of the portable radio device and may seriously destroy circuit elements of the IC, the LSI, or the like. Thus, the IC and the LSI are susceptible to the influence of the static electricity when they are encased in the nonconductive housing.

SUMMARY OF THE INVENTION

It is an object of this invention to provide a portable radio device which is not susceptible to static electricity.

It is another object of this invention to provide a portable radio device of the type described which is effective for protecting circuit elements formed in an IC, and LSI, or the like from the static electricity.

It is a further object of this invention to provide a portable radio device which is compact in size and can carry out various kinds of operations by the use of an intricate IC or LSI.

A portable radio device to which this invention is applicable comprises a printed wiring board having a first hole site for defining a tapped hole formed into the printed circuit board, a radio circuit mounted on the printed wiring board, an antenna, a housing of a nonconductive material adapted to encase the printed wiring board together with the radio circuit and having a second hole site which defines a via hole formed through the housing and aligned with the tapped hole when the printed wiring board is encased in the housing, and a machine screw having first and second ends, a head portion at the first end and a threaded portion near the second end for engagement with the tapped hole. The machine screw is for fixing the printed wiring board in position in the housing with the antenna brought into contact in the housing with the printed wiring board to be electrically connected to the radio circuit through the printed wiring board. According to this invention, the machine screw comprises an insulating portion of an electrically insulating material at least at the head portion. The insulating portion has at least one groove.

BRIEF DESCRIPTIOMN OF THE DRAWING

FIG. 1 schematically shows an exploded view of a conventional portable radio device;

FIG. 2 shows a sectional view taken along a line 2—2 illustrated in FIG. 1;

FIG. 3 schematically shows an exploded view of a portable radio device according to a preferred embodiment of this invention;

PREFERRED EMBODIMENTS OF THE INVENTION

Figure 1:
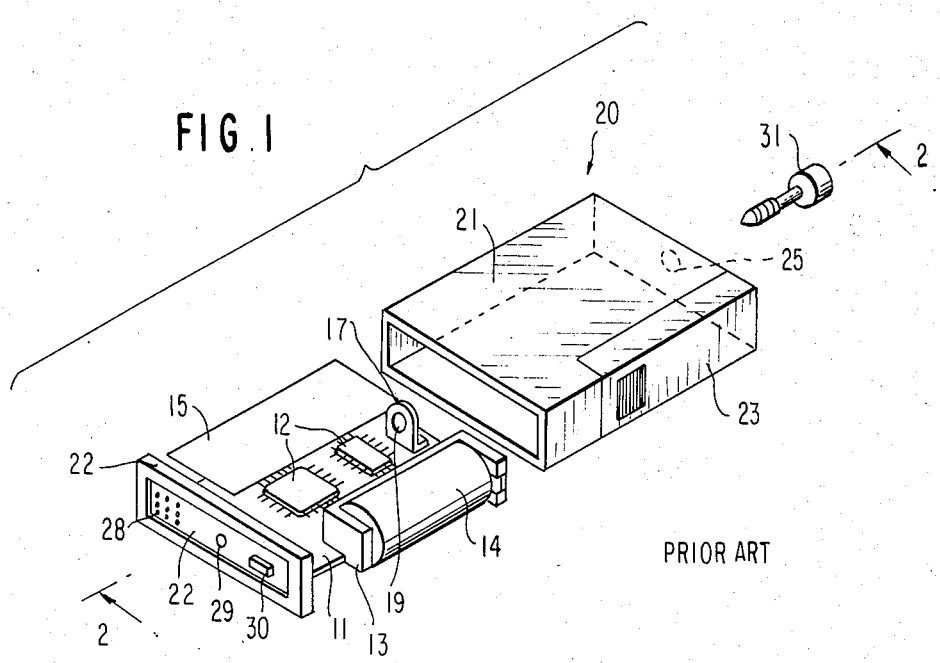
Figure 2:
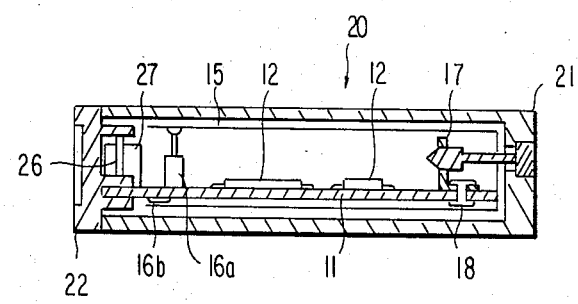

Referring to FIGS. 1 and 2, a conventional portable radio device is used as a radio pager and comprises a printed wiring board 11 having an upper or a first and a back or a second principal surface. Electrical wirings (not shown) are laid and printed on the upper and the back principal surfaces as a printed circuit in a usual manner. Circuit elements, such as IC's, LSI's, or the like are mounted on the upper principal surface and electrically connected to the electrical wirings to form a radio circuit for carrying out necessary electrical operation. In FIG. 1, the printed wiring board 11 is of a rectangular shape and has a front and a back end and a right-hand and a left-hand side. A battery case 13 is located on the right-hand side with the printed wiring board 11 partially cut away. A battery 14 is inserted in the battery case 13. An antenna 15 has a U-shaped section and is a little offset towards the left-hand side to partially cover the upper and the back principal surfaces via the back end of the printed wiring board 11 with a gap left between the antenna 15 and each of the upper and the back principal surfaces, as best shown in FIG. 2. As is illustrated in FIG. 2, the antenna 15 is fixed to the printed wiring board 11 by the use of first and second conductive supports 16a and 16b attached to the upper and the back principal surfaces, respectively.

An L-shaped lug 17 of a metal has a first arm plate and a second arm plate substantially perpendicular to the first arm plate and is affixed to the printed wiring board 11 near the back end on the upper principal surface of the printed wiring board 11. Specifically, a rivet 18 is put through the first arm plate and the printed wiring board 11 and caulked to make the lug 17 integral with the printed wiring board 11. The lug 17 has a first hole site for defining a tapped or threaded hole 19 on the second arm thereof and is made to be integral with the printed wiring board 11 at the first arm plate of the lug 17. Accordingly, the printed wiring board 11 is divided into a first plate member having the printed circuit for the radio circuit and the antenna 15 and a second plate member having the tapped hole 19 placed adjacently of the back end of the printed wiring board 11. Thus, the lug 17 may be called the second plate member.

Further referring to FIGS. 1 and 2, a housing 20 comprises a cabinet body 21 and a front panel 22 each of which is made of a nonconductive material of, for example, polycarbonate. The cabinet body 21 has a side wall member which is rectangular in section and which has a first or rear open end 212 and a second or front open end 216. The side wall member is adaptable for surrounding the printed wiring board 11, the battery case 13, the battery 14, and the antenna 15 all of which can be accommodated through the second end of the side wall member except the battery 14. The cabinet body 21 also has a rear end member 24 of the nonconductive material which is integral with the side wall member to close the first open end. In the illustrated cabinet body 21, the rear end member 24 has a second hole site for defining a via or through hole 25 formed through the cabinet body 21. The via hole 25 is aligned with the tapped hole 19 on the lug 17 when the printed wiring board 11 is encased in the cabinet body 21. As a result, the lug or the second plate member 17 is located adjacently of the end member parallel to the end member when the printed wiring board 11 is encased in the cabinet body 21. The battery case 13 and the battery 14 are covered with a battery cover 23 slidable in a backward direction or a forward direction of FIG. 1.

As is shown in FIG. 2, the front panel 22 is fitted to the cabinet body 21 to form the housing 20. The front end of the printed wiring board 11 is supported by the front panel 22 with the front end inserted into a slot formed on a rear surface of the front panel 22 and extended perpendicularly of the plane of FIG. 2. The printed wiring board 11 is fastened by the use of a pin 26 on the rear side of the front panel 22. In addition, a speaker 27 is located adjacent to the front panel 22 on the upper principal surface of the printed wiring board 11. The speaker 27 serves to audibly generate a ringing tone through a baffle board 28 having a plurality of holes formed through the front panel 22.

In FIG. 1, a light emitting diode 29 is attached to a front surface of the front panel 22 to optically inform, of reception of a calling signal, a person with the portable radio device together with a switch 30 for controlling supply of electric power.

The printed wiring board 11 is fastened by a machine screw 31 within the cabinet body 21 when the printed wiring board 11 is encased in the housing 20. More specifically, the machine screw 31 is made of a conductive material and has a head portion at a first end and a threaded portion near a second end. The illustrated machine screw 31 has a shank portion between the head and the threaded portions. The threaded portion is engaged with the tapped hole 19 of the lug 17 through the via hole 25 of the end member of the cabinet body 21 to fix the printed wiring board 11 to the cabinet body 21. In this case, the head portion of the machine screw 31 is received by the via hole 25 and inevitably exposed to the surrounding atmosphere. Therefore, a discharge takes place in the radio circuit through the machine screw 31 when a person's body is electrified or charged due to static electricity. As a result, the conventional portable radio device is disadvantageous as pointed out in the peramble of the instant specification.

Figure 3:
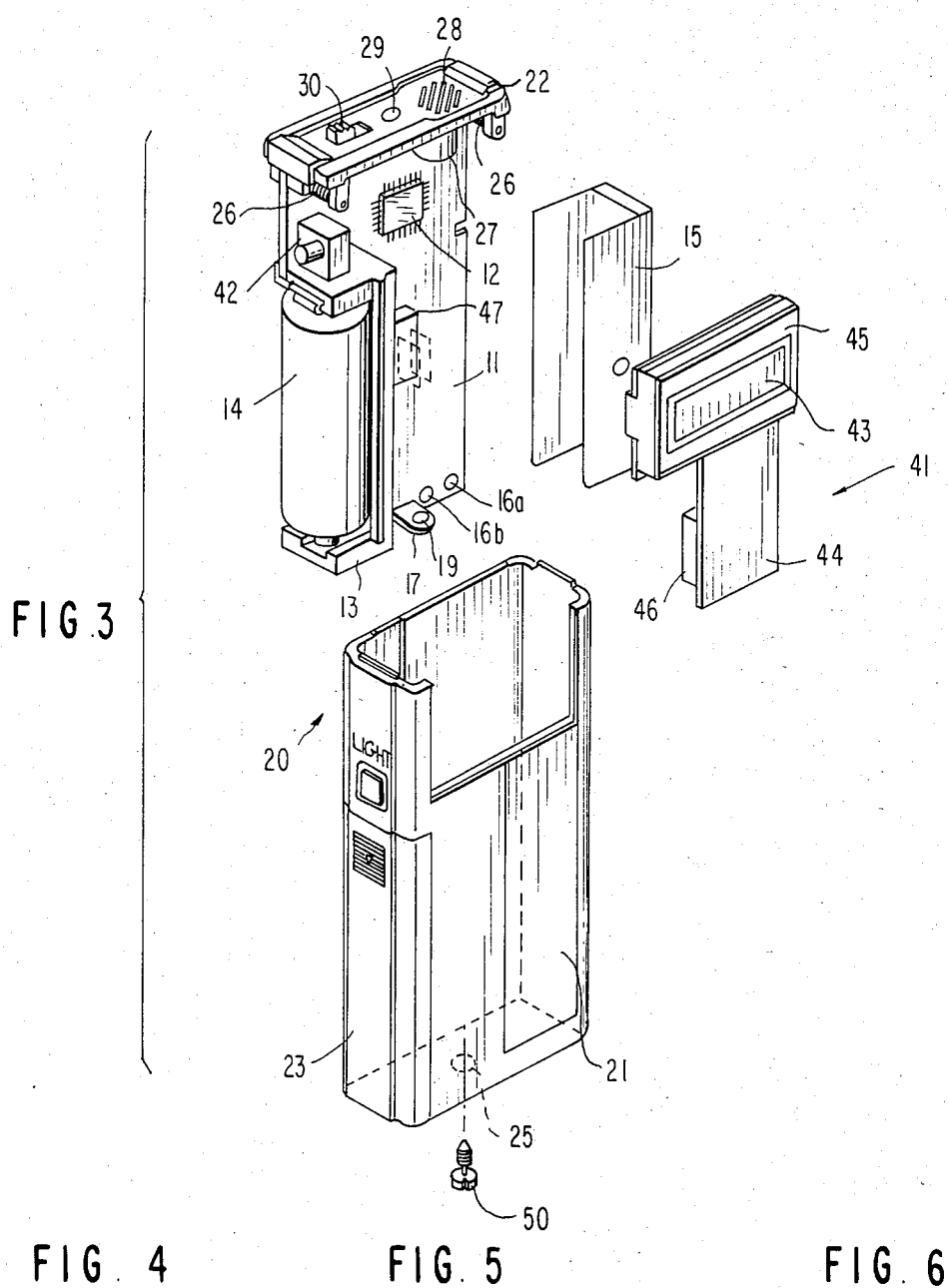

Referring to FIG. 3, a portable radio device according to a preferred embodiment of this invention comprises similar parts designated by like reference numerals. In FIG. 3, the illustrated portable radio device further comprises a display portion 41 for displaying a number of predetermined figures, such as ten figures, and an illuminating switch 42 for energizing the display portion 41. The display portion 41 comprises a frame 45, a display panel 43 surrounded by the frame 45, and an additional printed wiring board 44 for driving the display panel 43 in response to operation of the illuminating switch 42. The additional printed wiring board 44 is equipped with a first connector 46 in addition to an additional printed circuit 44.

The first connector 46 is electrically connected to a second connector 47 attached to the printed wiring board 11.

In FIG. 3, the first and the second conductive supports 16a and 16b are symbolized only by positions at which they are present.

It is known in the art display the number of the predetermined figures in the display panel 43. Accordingly, operation and circuit for the display will not be described any more.

Further referring to FIG. 3, the end member of the cabinet body 21 has a countersink around the via hole 25 to receive the head portion, as is the case with FIG. 2. In the illustrated portable radio device, a particular machine screw 50 (which will be detailed later) is used to fix the printed wiring board 11 in position to the cabinet body 21 without any charge or electrification due to the static electricity. Like in FIG. 2, the antenna 15 is brought into contact in the housing 20 with the printed wiring board 11 to be electrically connected to the radio circuit through the printed wiring board 11, although not explicitly described in FIG. 3.

Figure 7:
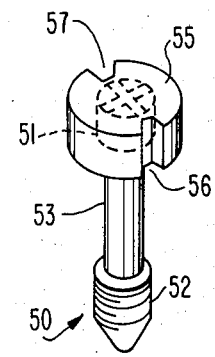
FIG. 7 shows a respective view of a second machine screw applicable to the portable radio device illustrated in FIG. 3.
Figure 4:
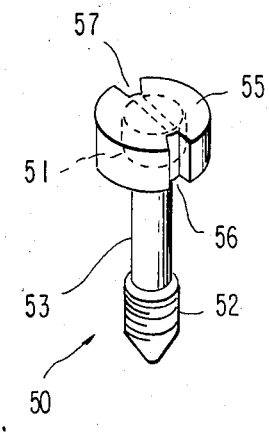
FIG. 4 shows a perspective view of a machine screw illustrated in FIG. 3.
Figure 5:
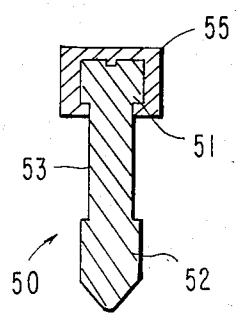
FIG. 5 shows an axial sectional view of the machine screw illustrated in FIG. 4.

Referring to FIG. 3 again and FIGS. 4 and 5, the particular machine screw 50 is made of metal and has a head portion 51 at a first end, a threaded portion 52 near a second end, and a shank portion 53 between the head and the threaded portions 51 and 52, as is the case with that illustrated in FIG. 1 or 2. The head portion 51 of the metal machine screw 50 may be called an internal head hereinafter for convenience of description. The internal head 51 is circular in cross section and has a screw plot. The internal head 51 is enclosed by or covered with an insulating cap 55 of an insulating material. Such an insulating material may be a plastic material, such as polycarbonate. A small amount of glass powder may be added to the plastic material when the polycarbonate is used as the insulating material. According to the inventors' experimental studies, the polycarbonate including glass has a volume resistivity not less than $2 \times 10^6$ Ωcm. As illustrated in FIG. 7 the internal head 51 may have a cross or Phillips-head screw slot. The embodiment of FIG. 7 is identical to that of FIG. 4 with the exception of the screw slot configuration.

Such an insulating cap 55 has a cylindrical shape formed by a cylindrical side surface, an upper end surface, and a lower end surface. A pair of grooves 56 and 57 are extended from the upper end surface to the lower end surface through the cylindrical side surface in parallel to an axis of the machine screw 50 extending from the internal head 51 to the threaded portion 52. The grooves 56 and 57 are opposite to each other on the cylindrical side surface. The insulating cap 55 can be attached to the internal head 51 by the use of a plastic molding technique. In addition, cross recessed slots are formed on an end of the internal head 51.

Anyway, the machine screw 50 illustrated in FIGS. 4 and 5 can be used to fix the printed wiring board 11 in position to the cabinet body 21 by engaging the machine screw 50 with the tapped or threaded hole 19 by the use of a particular screwdriver or tool having a bifurcated end point. Such a bifurcated screwdriver is known in the art and is, therefore, not described in the instant specification. More particularly, the bifurcated screwdriver is applied to the grooves 56 and 57 to rotate the insulating cap 55 in a predetermined direction or sense when the machine screw 50 is fastened to the lug 17 through the tapped hole 19. As a result, the insulating cap 55 is received in the countersink around the via hole 25. The machine screw 50 may be rotated in an inverse direction by the above-mentioned screwdriver when unfastened or loosened.

Since the grooves 56 and 57 are located outside a periphery of the internal head 51, a big torque can be caused by a weak manual power as compared with the case where the internal head 51 per se is rotated by a usual screwdriver. The screw slot or slots of the internal head 51 serve to protect the insulating cap 55 from being run idle and from being detached from the internal head 51.

In FIG. 3, when the machine screw 50 illustrated in FIGS. 4 and 5 is used to fix the printed wiring board 11 to the cabinet body 21, the insulating cap 55 alone is exposed to a surrounding atmosphere. Accordingly, the machine screw 50 is never charged or electrified by the static electricity even when the portable radio device is utilized under an environment that the static electricity readily takes place. No discharge occurs due to the static electricity in the radio circuit placed on the printed wiring board 11. The circuit elements 12, such as the IC's, the LSI's, and the like, are never destroyed by such a discharge. Therefore, the portable radio device illustrated in FIG. 3, which comprises the machine screw 50, strongly withstands the static electricity. In other words, the illustrated portable radio device is excellent in a resistivity against the static electricity.

Figure 6:
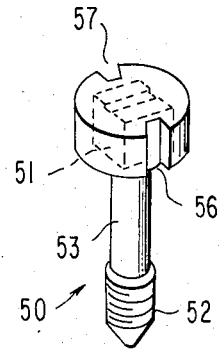
FIG. 6 shows a perspective view of another machine screw applicable to the portable radio device illustrated in FIG. 3.

Referring to FIG. 6, a machine screw 50 is applicable to the portable radio device illustrated in FIG. 3 and is similar to that illustrated with reference to FIGS. 4 and 5 except that the internal head 51 is square in cross section.

Alternatively, the machine screw 50 is wholly made of an insulating material. Thus, the machine screw 50 may comprise an insulating portion of an electrically insulating material at least at a head portion of the machine screw 50.

While this inventiion has thus far been described in conjunction with respect to the embodiments thereof, it is possible for those skilled in the art to put this invention into practice in various manners. For example, the insulating cap 55 may have a single groove or more than two grooves parallel to the axis of the machine screw. In FIGS. 4 and 5, the machine screw 50 may have at least one groove on the upper end surface of the insulating cap 55 transversely of the axis. Thus, at least one groove is formed in relation to a direction of the axis. The machine screw 50 may have only the threaded portion and the head portion without the shank portion. The internal head may have a polygonal shape except the square one in cross section. The tapped hole 19 may be formed direct to the printed wiring board 11 on the first plate member without the lug 17 and extended between the first and the second principal surfaces. In this case, the cabinet body 21 has the via hole 25 aligned with the tapped hole 19 on the side wall member. It is possible to use reinforced plastic as the insulating material. The conventional housing illustrated in FIGS. 1 and 2 can be utilized without any variation thereof.

What is claimed is:

1. A portable radio device comprising: a printed wiring board having a first hole site which defines a tapped hole formed into said printed circuit board, a radio circuit mounted on said printed wiring board, an antenna, a housing of a nonconductive material encasing said printed wiring board together with said radio circuit and having a second hole site which defines a via hole formed through said housing and aligned with said tapped hole when said printed wiring board is encased in said housing, and a screw member fixing said printed wiring board in position to said housing, with said antenna brought into contact in said housing with said printed wiring board to be electrically connected to said radio circuit through said printed wiring board, said screw member having a metal machine screw portion having first and second ends with a threaded portion near said second end and engaged with said tapped hole; an axis extending between said first and second ends, and a head portion having a screw slot transverse to said axis on said first end; and an insulating cap enclosing said head portion so as not to expose said screw slot and having a groove along said axis.

2. A portable radio device as claimed in claim 1, wherein said head portion is circular in cross section.

3. A portable radio device as claimed in claim 1, wherein said head portion is polygonal in cross section.

4. A portable radio device as claimed in claim 1, wherein said head portion has an additional screw slot intersecting said screw slot.

5. A portable radio device as claimed in claim 1, wherein said insulating cap has an additional groove parallel to both said groove and said axis.

* * * * *